United States Patent

Nakata et al.

[11] Patent Number: 5,878,289
[45] Date of Patent: Mar. 2, 1999

[54] CAMERA HAVING AUTOMATIC FOCUSING SYSTEM

[75] Inventors: Masahiro Nakata; Shigeru Iwamoto, both of Tokyo, Japan

[73] Assignee: Asahi Kogaku Kogyo Kabushiki Kaisha, Tokyo, Japan

[21] Appl. No.: 959,080

[22] Filed: Oct. 28, 1997

[30] Foreign Application Priority Data

Oct. 31, 1996 [JP] Japan ................................. 8-290409

[51] Int. Cl.$^6$ .................................................. G03B 13/36
[52] U.S. Cl. ............................................... 396/91; 396/95
[58] Field of Search ................... 396/91, 93, 95

[56] References Cited

U.S. PATENT DOCUMENTS

| 5,739,856 | 4/1998 | Watanabe | 396/95 X |
| 5,765,071 | 6/1998 | Watanabe | 396/95 X |

Primary Examiner—W. B. Perkey
Attorney, Agent, or Firm—Greenblum & Bernstein, P.L.C.

[57] ABSTRACT

A camera having an automatic focusing system includes a focus detector in a camera body to which a photographing lens can be detachably mounted for detecting a focus state for an object image formed by the photographing lens mounted to the camera body. A lens driver in the camera body drives a focusing lens group of the photographing lens to a focal position in accordance with the deflected focus state. A controller in the camera body drives the focusing lens group at a moving-object prediction mode, taking into account a movement of an image surface of the object when the object is a moving object. A memory in the photographing lens stores lens data used to either permit or prohibit an operation at the moving-object prediction mode. The controller determines whether to permit or prohibit the operation at the moving-object prediction mode in accordance with the lens data rear from the memory of the photographing lens.

10 Claims, 6 Drawing Sheets

CAMERA HAVING AUTOMATIC FOCUSING SYSTEM

BACKGROUND OF THE INVENTION

1. Field of the Invention

The present invention relates to a camera having an automatic focusing system, to which a photographing lens can be attached.

2. Description of the Related Art

A single lens reflex camera having an automatic focusing system (referred to as an AF single lens reflex camera) in which an amount of defocus for an object to be photographed is detected, so that a focusing lens group is moved to eliminate the defocus to thereby focus on the object, is known. In the known AF single lens reflex camera, the camera body is provided therein with a focusing system (object distance measuring device, defocus detecting device) and a lens drive motor for driving the focusing lens group of the photographing lens, etc., so that when the photographing lens is attached to the camera body, the focusing lens group can be moved by the lens drive motor in accordance with the amount of defocus detected by the defocus detecting device.

In the automatic focusing operation in a known AF single lens reflex camera, if the object is moving, that is, if the distance of the object from the camera changes, there is a possibility that a no in-focus state is obtained by the movement of the focusing lens group by the lens drive motor in accordance with the amount of defocus detected by the defocus detector. This is because the object moves close to or away from the camera after the detection of the focus, but before the completion of the movement of the focusing lens group. Moreover, there is a certain period of time (release time lag) between the depression of the release button and the commencement of the movement of the shutter. Consequently, upon photographing a moving object, even if an in-focus state has been established when the release button is depressed, the object which moves close to or away from the camera in the release time lag could be out-of-focus when the shutter is opened (at the beginning of the exposure).

In recent years, an AF single lens reflex camera having an action mode (focus prediction mode), called a "moving-object prediction mode" or an "object-tracing mode", has been proposed in which the focus can be adjusted in accordance with an algorithm on the action mode, so that the in-focus state can be established upon viewing the moving object or upon the operation of the shutter. In this AF single lens reflex camera, information on the focal length and the displacement of the focusing lens group necessary to move the image surface, on which an object image is formed, by the photographing lens is formed, or the angular displacement of the drive shaft of the lens drive motor, etc., is transmitted from the photographing lens to the camera body.

In general, in an AF single lens reflex camera, the detection of the defocus amount and the movement of the focusing lens group are carried out so as to establish an in-focus state. The defocus detection and the movement of the focusing lens group are repeated until the amount of defocus is zero. If a defocus amount of zero cannot be obtained even after a predetermined number of defocus detection operations and focusing-lens-group moving operations have been carried out, the object is then deemed as a moving object. Consequently, the control enters the moving-object mode in which the moving velocity of the object image surface is calculated based on the previous defocus amount and the current defocus amount detected when the focusing lens group was moved by a displacement corresponding to the previous defocus amount. Consequently, the lens drive motor is driven in accordance with the defocus amount which has been obtained, taking into account the moving velocity of the image surface, the space of time between the movement of the focusing lens group and the detection of the defocus amount.

If the release button is depressed when in the moving-object mode, the defocus amount caused by the movement of the moving object in the release time lag from the mirror-up operation to the commencement of the movement of the shutter blinds is predicted, so that the focusing lens group is moved in accordance with the predicted defocus amount to establish a nearly in-focus state when the shutter blinds are opened.

However, in some photographing lenses in which the change in the movement of the image surface relative to the angular displacement of the drive shaft of the lens drive motor (drive amount of the drive motor) when the focal length or the object distance varies is large, the above-mentioned solution is not useful. In this case, the drive amount (unit drive value) of the drive motor necessary to move the image surface by a unit displacement must be set to a minimum value to prevent over-movement. Consequently, there is a possibility that an in-focus state is not obtained by the number of the focus detection operations and the lens movement operations corresponding to the number of moving-object mode entries that are executed, so that even if the object stops moving, the object is judged to be a moving object. Thus, the control enters the moving-object mode. As a result, it is impossible to stop the focusing lens group at the focal position, and hence the focusing lens group moves beyond the focal position. Consequently, hunting occurs.

It is an object of the present invention to provide a single lens reflex camera having an automatic focusing system, to which various types of photographing lenses can be detachably mounted, wherein the entry into the moving-object mode is prohibited depending on the characteristics of the photographing lens to be mounted.

SUMMARY OF THE INVENTION

To achieve the object mentioned above, according to an aspect of the present invention, there is provided a camera having an automatic focusing system comprising: a focus detection means in a camera body to which a photographing lens can be detachably mounted for detecting a focus state for an object image formed by the photographing lens mounted to the camera body; a lens driving means in the camera body for driving a focusing lens group of the photographing lens to a focal position in accordance with the focus state thus detected by the focus detection means; a control means in the camera body for driving the focusing lens group at a moving-object prediction mode, taking into account the movement of an image surface of the object when the object is a moving object; a memory means in the photographing lens for storing lens data which is used to permit or prohibit the operation at the moving-object prediction mode, wherein the control means determines the execution or prohibition of the operation at the moving-object prediction mode in accordance with the lens data read from the memory means of the photographing lens.

According to another aspect of the present invention, there is provided a camera having an automatic focusing system comprising: a camera body to which a photographing lens can be detachably mounted, the camera body being provided with a focus detection means in a camera body to which a photographing lens can be detachably mounted for detecting a focus state for an object image formed by the photographing lens mounted to the camera body; a lens driving means in the camera body for driving a focusing lens group of the photographing lens to a focal position in accordance with the focus state thus detected by the focus detection means; a control means in the camera body for driving the focusing lens group at a moving-object prediction mode, taking into account the movement of an image surface of the object when the object is a moving object, wherein the photographing lens is provided with lens data which represents the relationship between the amount of drive of the lens driving means and the displacement of the image surface, and wherein the control means determines the execution or prohibition of the operation at the moving-object prediction mode in accordance with the lens data.

The present disclosure relates to subject matter contained in Japanese patent application No. 08-290409 (filed on Oct. 31, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
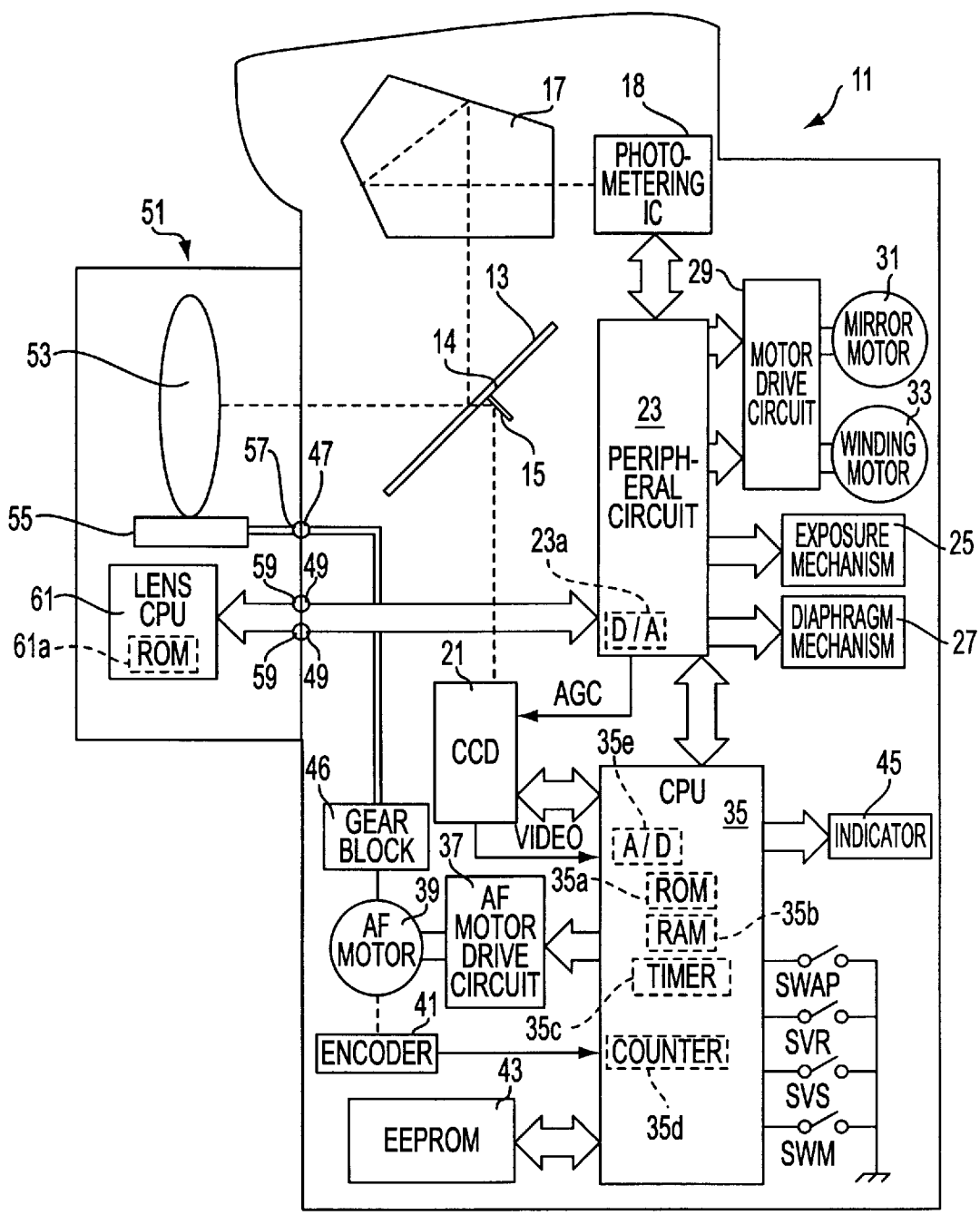
FIG. 1 is a block diagram of main components of a single lens reflex camera to which an automatic focusing system according to the present invention is applied.

FIG. 1 shows a block diagram of main elements of an automatic focusing (AF) single lens reflex camera to which the present invention is applied. The AF single lens reflex camera comprises a camera body 11 and a photographing lens 51 for an AF camera, which can be detachably attached to the camera body 11. The camera body 11 is provided therein with a multi-point auto-focusing means (multi-focus detection means) and an automatic focus control means.

A large part of object light incident upon the camera body 11 through the photographing lens 51, reflected by a main mirror 13 toward a pentagonal prism 17 which constitutes a finder optical system, is reflected by the pentagonal prism 17 and is emitted from an eyepiece. A part of the light reflected by the main mirror 13 is received by a light receiving element of a photometering IC 18. A part of the light incident upon a half mirror portion 14 of the main mirror 13 is transmitted therethrough, reflected downward by an auxiliary mirror 15, to made incident upon a multi-focus detection sensor unit 21.

The photometering IC 18 logarithmically compresses an electrical signal corresponding to the quantity of light received thereby and supplies the photometric data to a main CPU 35 through a peripheral control circuit 23. The main CPU 35 performs a predetermined exposure calculation in accordance with the photometric data and the film sensitivity to obtain an appropriate shutter speed and diaphragm value for the exposure. The photographing operation is carried out in accordance with the shutter speed and the diaphragm value thus obtained. Namely, an exposure mechanism (shutter mechanism) 25 and a diaphragm mechanism 27 are driven to expose the film. Moreover, the peripheral control circuit 23 drives a mirror motor 31 through a motor drive circuit 29 upon photographing operation to move the main mirror 13 up and down. Upon completion of the exposure, a film winding motor 33 is driven to wind the film by one frame.

The multi-focus detection sensor unit 21 is in the form of a phase difference type object distance measuring sensor which is composed of a beam splitter (not shown) which splits the object light forming an object image contained in a plurality of measuring zones within the image surface into two rays of light, and sensors (not shown) which receive and integrate the split rays of light (photoelectric conversion and accumulation of the electric charges).

The main CPU 35 calculates the amounts of defocus in accordance with the integral data corresponding to the focus detection zones supplied from the multi-focus detection sensor unit 21. The amount of defocus to be used, and the priority thereof, are set to thereby determine the direction of rotation and the number of revolutions of the AF motor 39 (the number of pulses output from the encoder 41). The main CPU 35 drives the AF motor 39 through the AF motor drive circuit 37 in accordance with the direction of rotation and the number of pulses. The main CPU 35 detects and counts the number of pulses output from the encoder 41 in association with the rotation of the AF motor 39. When the counted number reaches the pulses determined as above, the AF motor 39 is stopped.

The main CPU 35 can perform a DC-driving of the AF motor 39 and a constant-speed control of the AF motor using PWM (pulse width modulation) control in accordance with the pitch of the output pulses of the encoder 41 before the AF motor 39 stops. The rotation of the AF motor 39 is transmitted to the photographing lens 51 through a connection between a body joint 47 provided on a body mount of the camera body 11 and a lens joint 57 provided on a lens mount of the photographing lens 51. Consequently, the focusing lens 53 is moved in the optical axis direction through the lens drive mechanism 55.

The main CPU 35 contains a ROM 35a which stores a predetermined control, etc., a RAM 35b which temporarily stores calculation data and control data and a counter 35d as a hardware and an A/D converter 35e. An external memory EEPROM 43 is connected to the main CPU 35. The EEPROM 43 stores therein various constants or factors inherent to the camera body 11.

Connected to the main CPU 35 is a photometering switch SWS which is turned ON by a half depression, a release switch SWR which is turned ON by a full depression, an auto-focus switch SWAF which is adapted to switch an automatic focus control and a manual focus control, and a main switch SWM which is actuated to turn ON or OFF the power source which supplies the power to the main CPU 35 or the peripheral devices, etc. The main CPU 35 indicates the set modes (AF mode, exposure mode, photographing mode, etc.), the shutter speed, the diaphragm values, etc., in an indicator 45. In general, the indicator 45 includes two indicators provided on the outer surface of the camera body 11 and in the field of view of the finder.

The main CPU 35 generally controls the camera body and the photographing lens functions, not only as an integral control means, together with the multi-focus detection sensor unit 21 and the peripheral control circuit 23, etc., but also as a lens drive means together with the AF motor 39, etc.

The photographing lens 51 is provided with a focus control mechanism 55 which drives the focusing lens 53 in the optical axis direction; the lens joint 57 provided on the mount of the photographing lens 51 as discussed above, which is connected to the body joint 47 of the camera body 11 to transmit the rotation of the AF motor 39 to the focus control mechanism 55; and a lens CPU 61.

The lens CPU 61 is connected to the peripheral control circuit 23 of the camera body 11 through a group of electrical contacts 59 and 49, so that a data communication with the main CPU 35 of the camera body 11 can be carried out through the peripheral control circuit 23. Data transmitted from the lens CPU 61 to the peripheral control circuit 35 includes a controllable full-open diaphragm value Av (full open aperture F in terms of apex value), maximum diaphragm value Av (minimum aperture in terms of apex value), lens position data, the unit drive value (K-values), or data which permits or prohibits the entry into the moving-object mode, etc. The unit drive value (K-value) data refers to the number of pulses output from the encoder 41 (number of revolutions of the AF motor 39) necessary to move the image surface formed by the photographing lens 51 in the optical axis direction by a unit displacement (e.g., 1 mm) by the movement of the focusing lens group which is driven by the AF motor 39.

In the AF single lens reflex camera, the AF operation begins when the photometering switch SWS is turned ON. In the AF operation, first the multi-focus detection sensor unit 21 commences the integral operation. Upon completion of the integral operation, the main CPU 35, to which the integral data is input, calculates the defocus amount and the number of drive pulses in accordance with the integral data to thereby drive the AF motor 39 based on the drive pulses thus obtained.

The multi-focus detection sensor unit 21 receives the object light incident upon the photographing lens 51 and is transmitted through the central half mirror portion 14 of the main mirror 13 and reflected by the auxiliary mirror 15. The object light incident upon the multi-focus detection sensor unit 21 is converged onto a secondary image forming surface conjugate with the film surface, or in the vicinity thereof, and is transmitted through three windows formed in a mask provided on the secondary image forming surface. The object light is then made incident upon different light receivers. The three windows define the focus detection zones, so that the object light contained in each focus detection zone is split into two rays of light by beam splitters (not shown), which are received by respective light receivers provided on the image re-forming surface.

The single lens reflex camera according to the present invention is provided with a moving-object mode or a moving-object prediction mode as one of the auto-focus modes. The synopsis of the AF operation prior to entering the moving-object prediction mode will be discussed below with reference to FIG. 2.

Figure 2:
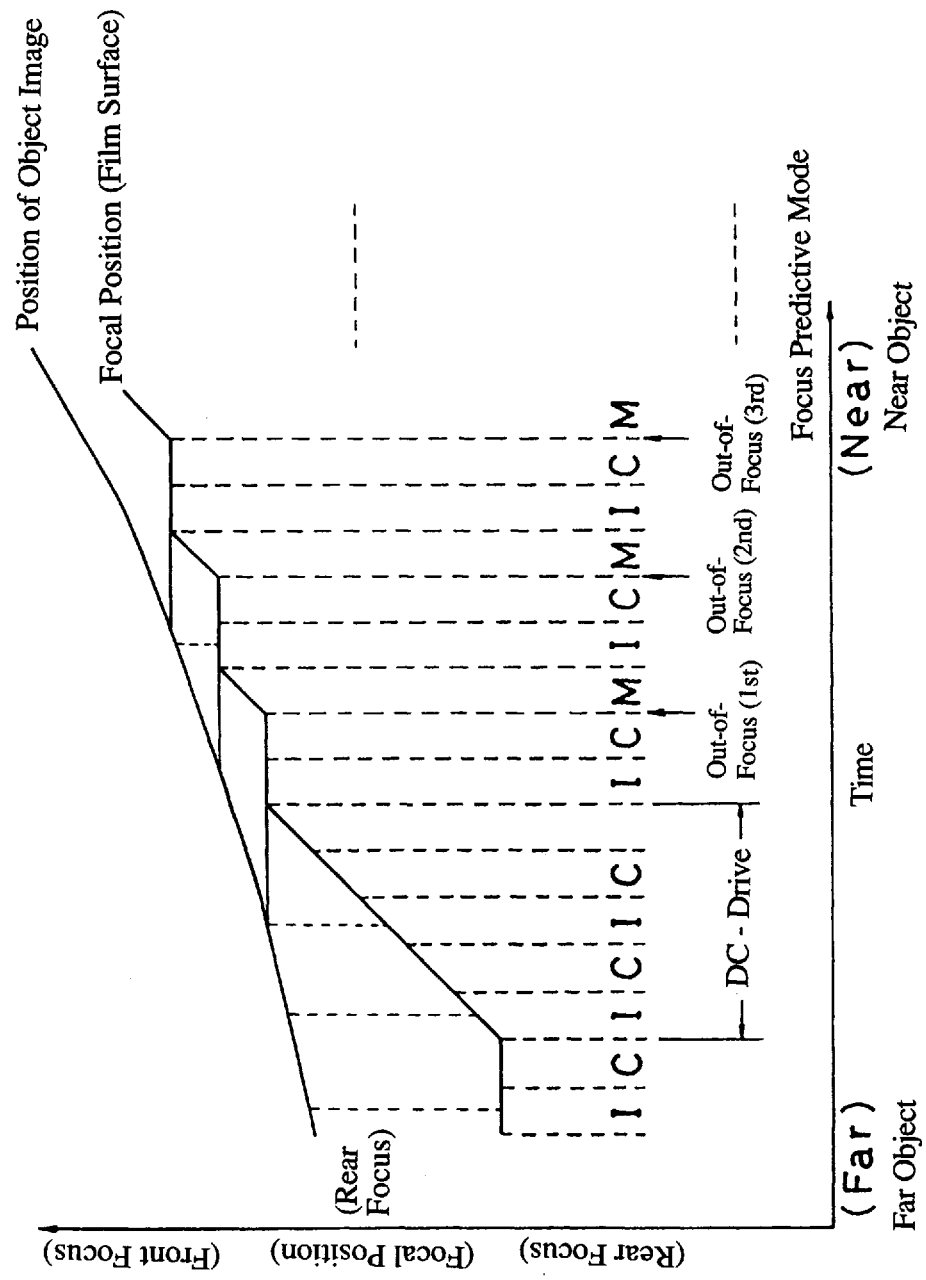
FIG. 2 is a graph showing a relationship between a position of an object image surface and a focal point before the entering a moving-object prediction mode in the single lens reflex camera shown in FIG. 1.

FIG. 2 shows a relationship between the position of the object image and the focal position (position of the film surface) when the object distance varies; i.e., shows the defocus state. The abscissa represents the time and the ordinates represent the positions of the object image and the focal position. The focal position is defined by an approximate distance between the rear principal point of the photographing lens 51 or the reference point of the focusing lens group 53 and the film surface, and the position of the object image is defined by an approximate distance between the rear principal point of the photographing lens 51 or the reference point of the focusing lens group 53 and the image surface formed by the photographing lens 51, respectively. In FIG. 2, the difference in position between the focal point and the object image defines the defocus amount. The front focus corresponds to the position in which the focal point is located above the object image, and the rear focus corresponds to the position in which the focal point is located below the object image, respectively. The in-focus state is obtained when the focal point is identical to the object image.

In the AF operation which begins when the photometering switch SWS is depressed, the lens is driven by the AF motor 39 in accordance with the number of AF pulses obtained by the first integral operation I and calculation C. In the illustrated embodiment, if the defocus amount (or the number of the drive pulses) is larger than a predetermined value as a result of the first integral operation and calculation, which is effected by the operation of the photometering switch SWS, the AF motor 39 is driven at the maximum speed (DC drive); and the integral operations and calculations are repeated during the movement of the lens (overlap operation). If the defocus amount is smaller than the predetermined value during the repeated integral operations and calculations, the lens is driven in accordance with the number of drive pulses which has been obtained by the latest integral operation and calculation, and the subsequent integral operation and calculation are ceased.

When the first lens drive is completed, a check is made to confirm whether the in-focus state has been obtained based on the defocus amount, obtained by the integral operations and calculations which are carried out again. If the in-focus state is not established, the second lens drive operation is carried out. Thereafter, another check is made to confirm whether the in-focus state has been obtained based on the defocus amount, obtained by the integral operations and calculations after the second lens drive operation. If the in-focus state is not established, the third lens drive operation is carried out. Thereafter, a third check is made to confirm whether the in-focus state has been obtained based on the defocus amount, obtained by the integral operations and calculations after the third lens drive operation. If the in-focus state is not established by the third lens drive operation, it can be then considered that the object is moving. Thus, the control enters the moving-object prediction mode.

If the in-focus state is obtained in the above mentioned checking operations, it can be assumed that the object is not moving. However, the photometering operation and the lens drive operation are carried out again, if necessary, after the lapse of a predetermined waiting time; taking into account the probability that the object is a moving object. If there is an interruption by the operation of the release switch SWR within the predetermined waiting time, the release operation is carried out. Conversely, if there is no interruption by the operation of the release switch SWR within the predetermined waiting time, the photometering operations and the lens drive operations are repeated while the photometering switch SWS is kept ON.

Figure 3:
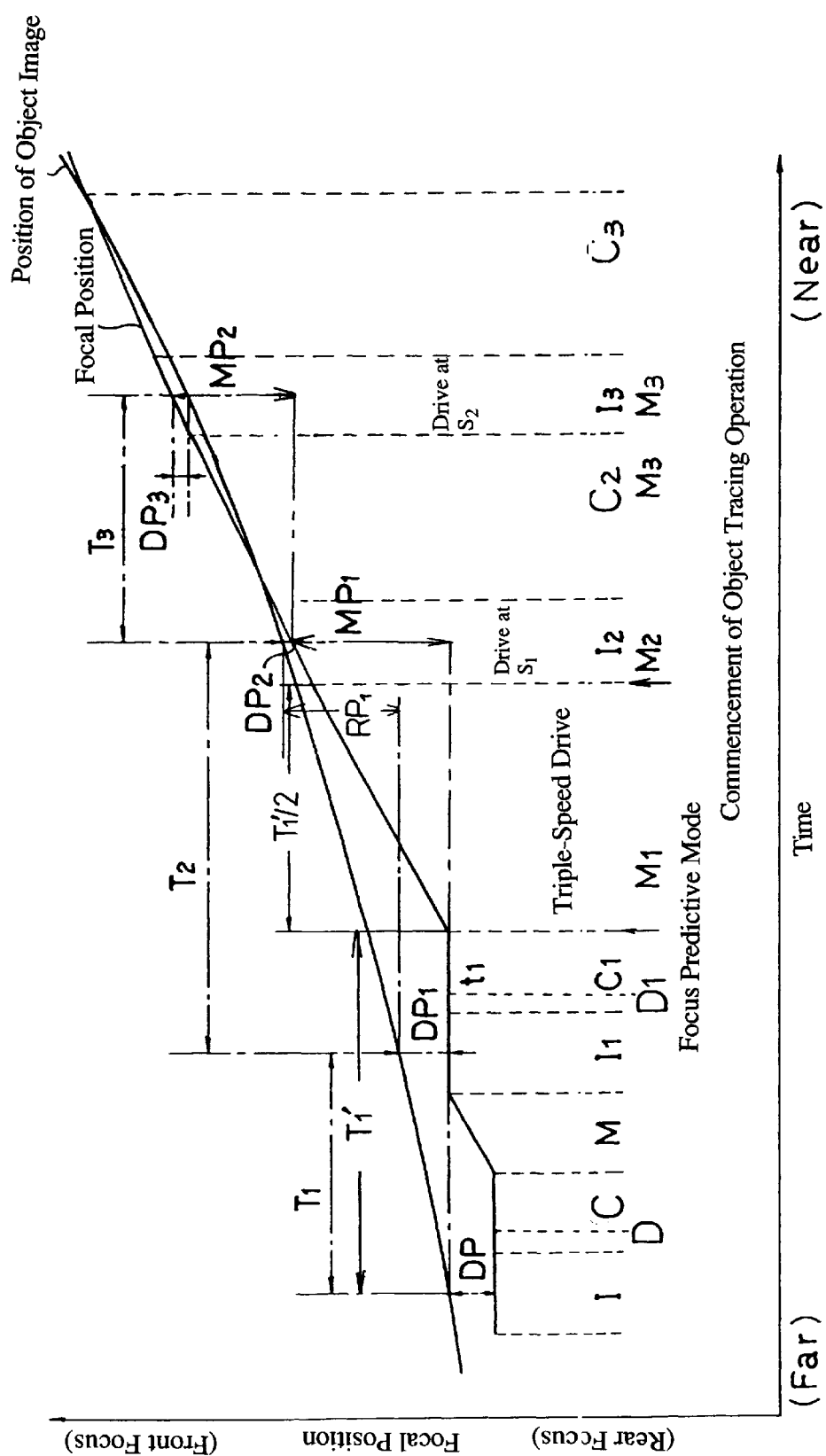
FIG. 3 is a graph showing the relationship between the position of the object image surface and the focal point after the entering the moving-object prediction mode in a single lens reflex camera shown in FIG. 1.

The operation at the moving-object prediction mode will be discussed below with reference to FIG. 3. The number of defocus pulses DP1 is obtained by the calculation C1 based on the result of the integral operation I1 when the object is judged to be a moving object. Furthermore, the moving speed of the object image surface (object tracing speed) S1 is obtained by the calculation C1 based on the time T1 from the intermediate point of the previous integral operation I and the intermediate point of the current integral operation I1. To make the object image surface coincident with the film surface within an extremely short space of time, a constant-speed control (e.g., triple-speed lens drive) M1 is carried out for the time T1'/2 in which the image surface moves at a speed multiple times more than that of the object tracing speed S1 (e.g., 3 times). A second constant-speed lens control M2 is carried out in which the image surface is moved at the object tracing speed S1 while the integral operation I2 and the calculation C2 are effected after the triple-speed lens drive M1 has been completed. Note that the moving speed of the object image refers to the speed of the movement of the image surface formed by the photographing lens 51 along the optical axis.

In the calculation C2, the object tracing speed S2 is calculated based on the previous and current numbers of the defocus pulses DP1 and DP2, the actual number of the drive pulses MP1 and the time T2 between the integral operations T1 and T2. Upon completion of the calculation C2, the integral operation I3 begins. The tracing lens drive M3 is carried out at the object tracing speed S2 during the integral operation I3 and the calculation C3. In the illustrated embodiment, the tracing is carried out with the defocus corresponding to the number of the defocus pulses DP3. The above-mentioned object tracing operations are repeated.

If the object image surface agrees or substantially agrees with the focal point as a result of the tracing operation, the focus control operation is carried out.

Figure 5:
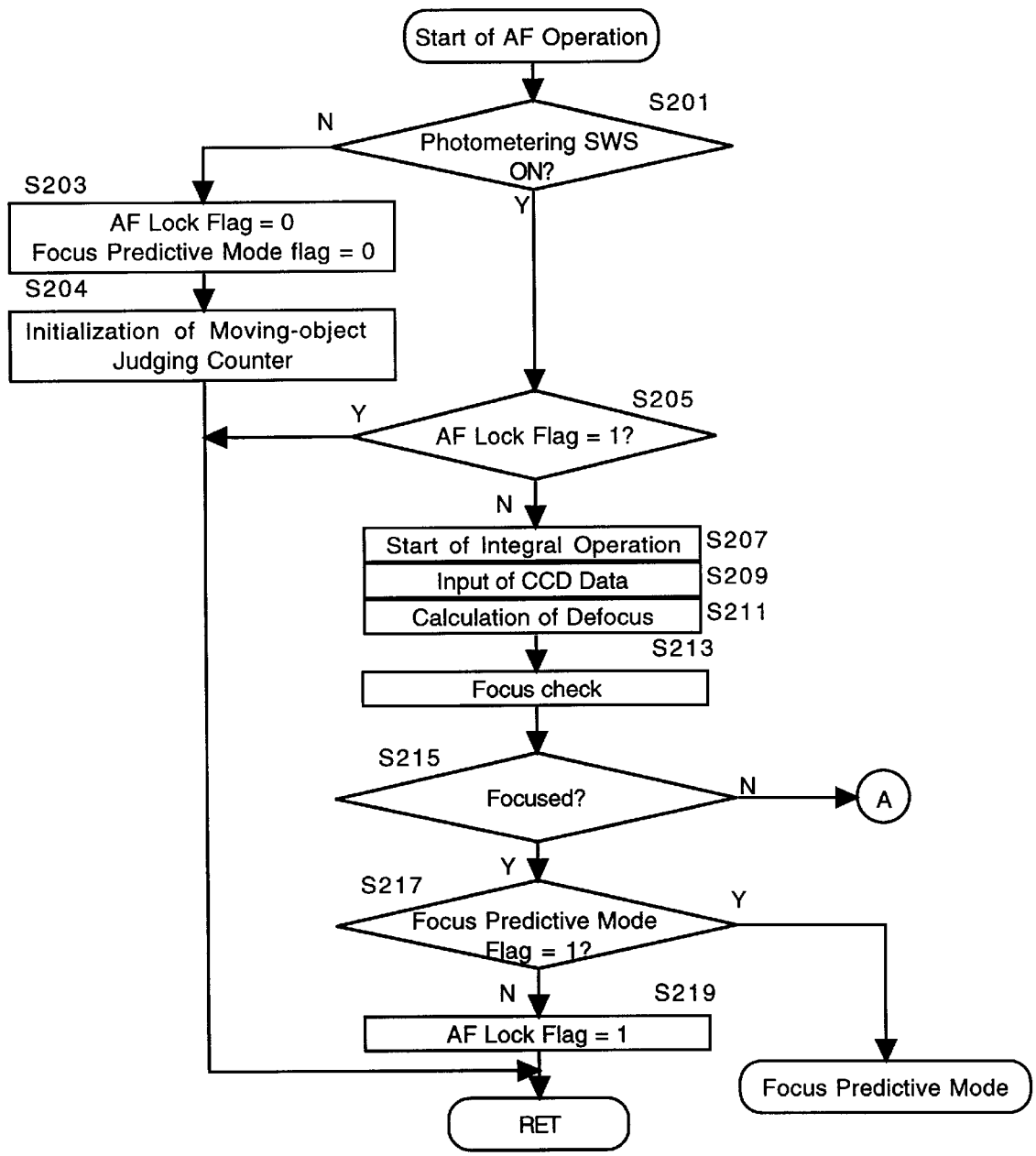
FIGS. 5 and 6 are flow charts of an AF operation of the ingle lens reflex camera shown in FIG. 1.
Figure 6:
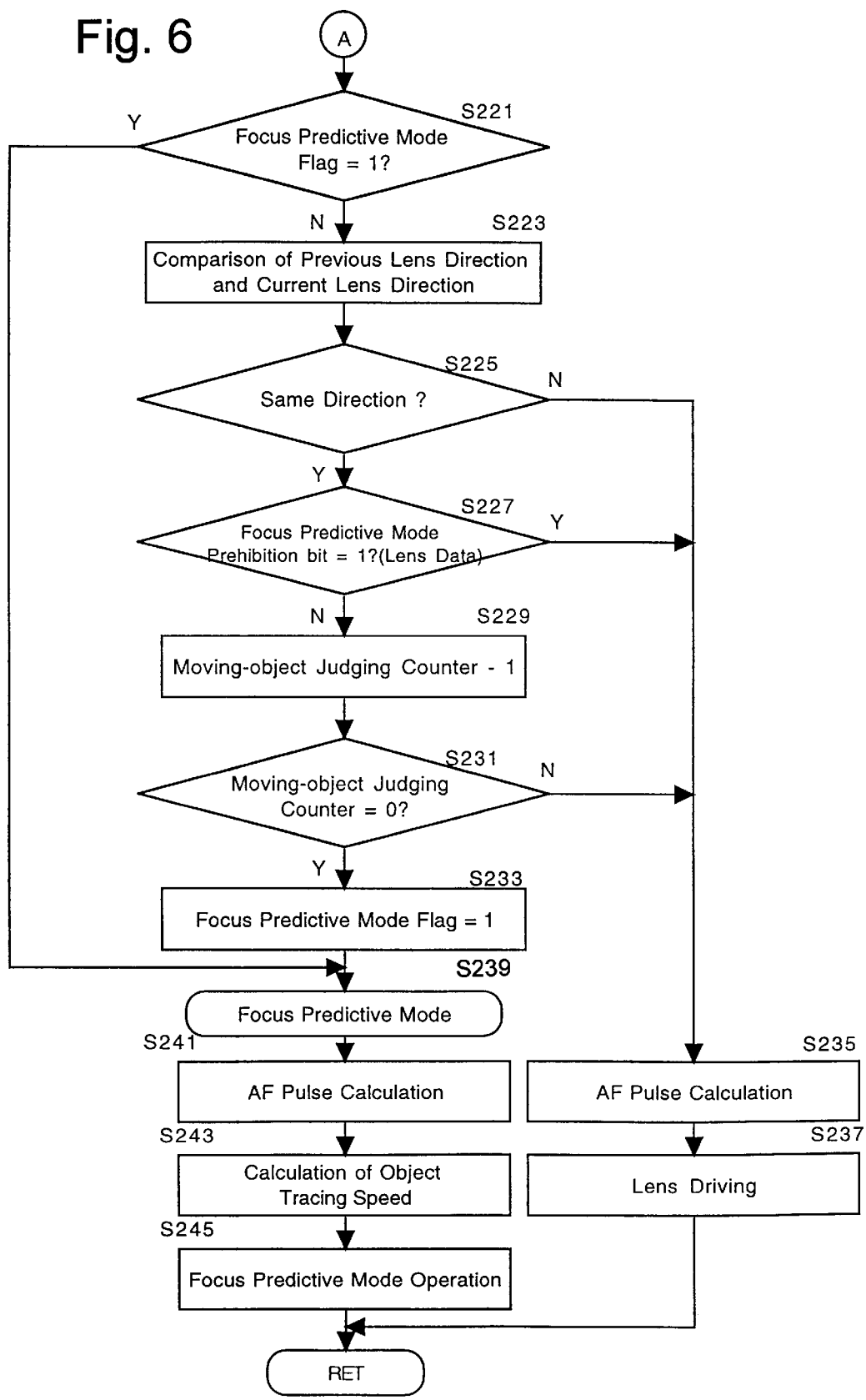

The focus control operation of an AF single lens reflex camera having a multi-point auto-focusing system will be discussed below, referring to FIGS. 4 through 6.

<Main Operation>

Figure 4:
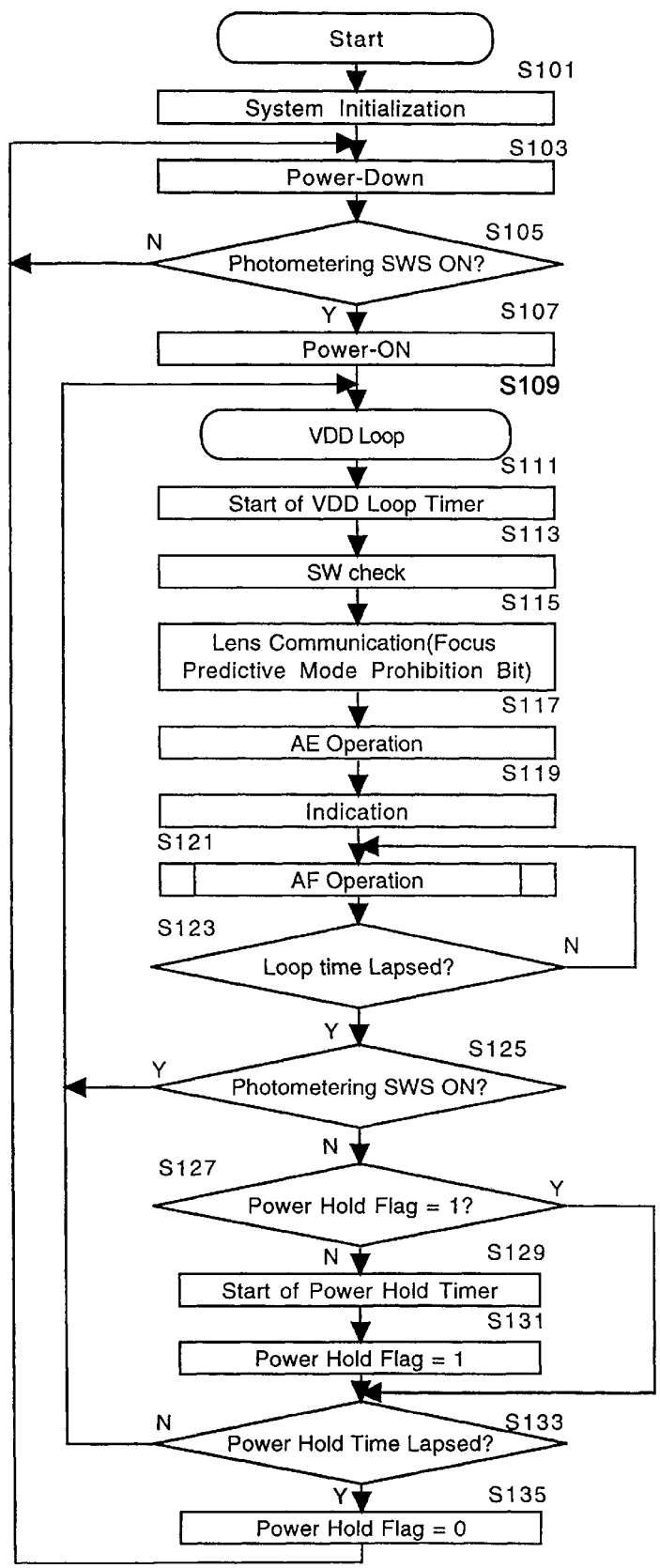
FIG. 4 is a flow chart of the main operation of a single lens reflex camera shown in FIG. 1.

FIG. 4 shows a flow chart of the main operation of the single lens reflex camera. In the main operation, when the photometering switch SWS is turned ON, the photometering operation and the exposure calculation (AE operation) are executed to obtain the optimum diaphragm value and the shutter speed. Thereafter, the lens drive operation (AF operation) is carried out in accordance with the defocus amount detected by the focus detection operation to establish an in-focus position. If the release switch SWR is turned ON, the exposure is carried out at the diaphragm value and shutter speed obtained in the AE operation mentioned above.

The control enters the routine of the main operation when a battery is loaded. In this routine, the RAM 35b is initialized (S101). The power supply to circuits or devices other than the main CPU 35 is interrupted and the control does not proceed until the photometering switch SWS is turned ON (S103, S105). If the photometering switch SWS is turned ON, power is supplied to the peripheral devices (S107) to perform the operation of the VDD loop (S109).

In the VDD loop, the VDD loop timer starts (S111); the state of the switches is checked (S113); data communication with the lens CPU 61 is carried out to transmit lens data including a moving-object prediction mode prohibition bit, the K-value data, the full-aperture value, the minimum diaphragm value, the focal length data, etc. (S115). It should be noted here that if the K-value of a photographing lens is small and the defocus amount thereof is great, it takes a long time to move the focusing lens group to a focal position, so that the in-focus state cannot be obtained by the several integral operations, calculations and movements of the focusing lens group. Consequently, the object which is not moving could be judged to be a moving object, thus resulting in an entry into the moving-object prediction mode. For such a photographing lens, the moving-object prediction mode prohibition bit is used to prevent the entry into the moving-object prediction mode.

The AE operation is performed (S117) and information on the photographing operation, such as the shutter speed, etc., is indicated (S119). The AE operation refers to an operation to measure the brightness of the object using the photometering IC 18 and obtain the optimum shutter speed and diaphragm value at a predetermined exposure mode, for example, a control exposure mode; based on brightness data and film sensitivity data, etc.

If the optimum shutter speed and diaphragm value are determined, the defocus amount and the AE pulse number are obtained by the integral operation and focus detection operation, and thereafter the focusing lens group 53 is moved to focus on the object (S121). This AF operation is repeated until the loop time lapses (S123).

After the lapse of the loop time, a check is made to confirm whether the photometering switch SWS is ON. If the photometering switch SWS is turned ON, control is returned to the VDD loop operation (S125, S111). If the photometering switch SWS is turned OFF, a check is made to confirm whether the power hold flag has been set. If no power hold flag has been set, the power hold timer starts. The VDD loop operation repeats until the set time of the power hold time is up after the setting of the power hold flag (S125, S127, S129, S131, S133, S111). When the power hold time has lapsed, the power hold flag is cleared and control is returned to the power-down operation (S133, S135, S103).

<AF Start Operation>

The AF start operation will be discussed with reference to the flow charts of FIGS. 5 and 6. In the illustrated embodiment, whether the object is a moving object is determined based on whether the in-focus position has been obtained by three consecutive AF operations (integral operations, CCD data input operations, defocus calculations, AF pulse calculations, and lens drive operations). If the object is judged to be a moving object, the moving speed of the object image surface is determined in accordance with the time interval between the previous integral operation and the current integral operation, the previous defocus amount and the current defocus amount. Consequently, upon driving the lens, the AF motor 39 is driven at a speed faster than (three times) the moving speed of the image surface through an angular displacement which is larger than the current defocus amount by a predetermined value to thereby move the image surface close to the film surface. Upon releasing, the AF motor 39 is driven for a time corresponding to the time lag, which is longer than a predetermined time, so that the position of the image surface can virtually correspond exactly to the position of the film surface at the beginning of the movement of the shutter (commencement of the exposure operation).

In the AF start operation, a check is made to confirm whether the photometering switch SWS is ON (S201). If the photometering switch SWS is turned OFF, the AF lock flag and the moving-object prediction mode flag are set to "0", and the moving-object determining counter is initialized (an initial value of 3 is set). Thereafter control is returned (S201; No, S203, S204). The AF lock flag is set once the in-focus position is obtained; once the lens is focused on an object, the focused state for the object is maintained. Namely, the focus lock can be achieved when the AF lock flag is set. The moving-object prediction mode flag is used to distinguish the moving-object prediction mode from other modes. When the moving-object prediction mode is selected, the moving-object prediction mode flag is set to "1".

If the photometering switch SWS is ON, a check is made to confirm whether or not the AF lock flag has been set to "1". If the AF lock flag has been set to "1", control is returned (S205; Yes). If the AF lock flag has not been set to "1" (step S205 is NO), an integral operation beings at step S207. Upon completion of the integral operation, the CCD video data is input, so that the defocus is detected for the selected focus detection zone (S209, S211). Thereafter, a check is made to confirm whether or not the lens is focused on the object. If the lens is in-focus, a check is made to confirm whether the moving-object prediction mode flag has been set to "1", i.e., whether control has entered the moving-object prediction mode. If control has not entered the moving-object prediction mode, the AF lock flag is set to "1" and control is returned (S215; Yes, S217; No, S219). Even if the lens is in focus, if the moving-object prediction mode flag has been set to "1", control skips to a moving-object prediction mode operation (S215; Yes, S217; Yes; S239).

If the lens is out of focus at step S215, control enters the moving-object checking operation (S215; No, S221–S233). A check is made to confirm whether the moving-object prediction mode flag has been set to "1" at step S221. If the moving-object prediction mode flag has been set to "1", control skips to the moving-object prediction mode operation (S221; Yes, S239). If the moving-object prediction mode flag has not been set to "1", the direction of the previous movement of the lens is compared with the direction of the current movement thereof. If both directions are not identical, i.e., if the drive direction is different from that of the previous movement, it can be considered that the moving object has suddenly decelerated, stopped or the direction of the movement of the moving object has changed. Consequently, control skips the moving-object determining operation (S229–S233). Thereafter, the AF pulse number is calculated in the AF pulse number calculation operation, in accordance with the defocus and the K-value data. Thus, the AF motor 39 is driven in accordance with the AF pulse number obtained (S221; No, S223, S225; No, S235, S237).

If the directions are identical at step S225, i.e., if the sign of the previous defocus and the sign of the current defocus are identical, a check is made to confirm whether the moving-object prediction mode prohibition bit is "1" at step S227. If the flag has been set to "1", the AF pulse calculation operation and the lens drive operation are carried out, and thereafter control is returned (S225; Yes, S227; Yes, S235, S237). The moving-object prediction mode prohibition bit is set in accordance with data input from the photographing lens 51 through the data communication with the photographing lens 51 at step S115. If the bit has been set to "1", control does not enter the moving-object prediction mode. This is because if the K-value is small and the defocus amount is large, even if the object is stationary, there is a possibility that the focusing lens group 53 cannot be moved to the focal position while the three moving-object checking operations are repeated.

If the moving-object prediction mode prohibition bit does not equal "1", the number of the moving-object determining counter is decreased by one, and thereafter a check is made to confirm whether the number of the counter is zero (S227; No, S229, S231). If the number of the counter is not zero, the AF pulse calculation and the lens drive operation are carried out, and thereafter the control is returned (S231; No, S235, S237). If the number of the counter is zero, the moving-object prediction mode flag is set to "1", and thereafter control enters the moving-object prediction mode (S231; Yes, S233).

In the illustrated embodiment, the moving-object prediction mode prohibition bit is stored as part of the lens data in the ROM (memory means) 65a of the lens CPU 61 provided in the photographing lens 51, and is transferred to the main CPU 35 through the data communication with the photographing lens 51. If the photographing lens has no lens communication function, it is possible to store a moving-object prediction mode "OK" bit, instead of the moving-object prediction mode prohibition bit, so that the moving-object prediction mode is prohibited (moving-object prediction mode prohibition bit is set to "1") when no moving-object prediction mode "OK" bit is received from the photographing lens. Moreover, it is also possible to detect the K-value supplied from the photographing lens in order to judge whether the K-value is smaller than a predetermined value using the main CPU 35. If the K-value is smaller than the predetermined value, the CPU 35 prohibits the moving-object prediction mode.

<Moving-Object Prediction Mode>

At the moving-object prediction mode, the integral operation is carried out for the moving object, so that the lens is driven in accordance with the calculated defocus plus a predictive defocus which is determined taking into account the displacement of the moving object before the subsequent integral and defocus calculation operations are carried out.

In the moving-object prediction mode operation, the AF pulse number calculation is carried out, the object tracing speed is calculated and the focus predictive focusing operation is carried out (S241, S243, S245). Thereafter, control is returned.

As can be seen from the foregoing, according to the present invention, when the moving-object prediction mode prohibition bit "1" is supplied from the photographing lens, control does not enter the moving-object prediction mode, and hence, there is no fear of the moving-object prediction mode being selected for the stationary object, even in case of a photographing lens having a slow image surface moving speed. Moreover, there is no possibility that the control enters the moving-object prediction mode in spite of being incapable of tracing the object.

Although the moving-object prediction mode is prohibited when the moving-object prediction mode prohibition bit "1" is supplied from the photographing lens in the illustrated embodiment, it is possible to store a moving-object prediction mode permission data (bit) in the photographing lens, so that the moving-object prediction mode is permitted only when the moving-object prediction mode permission bit from the photographing lens is received. Moreover, it is possible to determine the permission or prohibition of the moving-object prediction mode, based on the K-value transferred from the photographing lens without storing data on the focus predictive focusing operation in the photographing lens. It goes without saying that in case of a photographing lens having no K-value to be transferred, the automatic focus control or the moving-object prediction mode is prohibited, since the automatic focusing control cannot be effected.

As may be understood from the above discussion, since, according to the present invention, a memory means is provided in the photographing lens to store lens data which represents the permission or prohibition of the moving-object prediction mode, so that the main CPU of the camera body can determine whether the focus predictive focusing operation should be carried out or prohibited in accordance with the lens data, there is no possibility that the moving-object prediction mode is selected for the stationary object in the photographing lens having a small unit displacement of the focusing lens.

What is claimed is:

1. A camera having an automatic focusing system, comprising:

a focus detector, in a camera body to which a photographing lens is detachably mounted, that detects a focus state of an object image formed by said photographing lens mounted to said camera body;

a lens driver in said camera body that drives a focusing lens group of said photographing lens to a focal position in accordance with said focus state detected by said focus detector;

a controller, in said camera body, for driving said focusing lens group at a moving-object prediction mode, taking into account a movement of an image surface of said object, when said object is a moving object; and a memory, in said photographing lens, that stores lens data used to one of permit and prohibit an operation at said moving-object prediction mode;

wherein said controller determines said permit or prohibit of said operation at said moving-object prediction mode in accordance with said lens data read from said memory of said photographing lens.

2. A camera having an automatic focusing system according to claim 1, wherein said focus state is represented by said amount of defocus of said image surface relative to one of a film surface and a light receiving surface of said camera.

3. A camera having an automatic focusing system according to claim 1, wherein said permit or prohibit of said operation at said moving-object prediction mode is determined in accordance with unit drive value data of said lens driver necessary to move said image surface formed by said photographing lens through a unit displacement data along an optical axis by moving said focusing lens group of said photographing lens mounted to said camera body.

4. A camera having an automatic focusing system according to claim 3, wherein said permit or prohibit of said operation at said moving-object prediction mode is determined by said camera body in accordance with said unit displacement data of said lens driving means supplied from said photographing lens.

5. A camera having an automatic focusing system according to claim 4, wherein said unit displacement data refers to a number of revolutions of said lens driver necessary to move said image surface formed by said photographing lens in said optical axis direction by a unit displacement by said movement of said focusing lens group which is driven by said lens driver.

6. A camera having an automatic focusing system according to claim 5, wherein said controller determines said prohibit of said moving-object prediction mode when said unit displacement data is smaller than a predetermined value.

7. A camera having an automatic focusing system according to claim 5, wherein said controller determines said prohibit of said moving-object prediction mode when said unit displacement data is larger than a predetermined value.

8. A camera having an automatic focusing system according to claim 1, wherein said lens data is "permission data", which permits said operation at said moving-object prediction mode.

9. A camera having an automatic focusing system according to claim 1, wherein said lens data is "prohibition data", which prohibits said operation at said moving-object prediction mode.

10. A camera having an automatic focusing system, comprising:

a camera body, to which a photographing lens is detachably mounted, said camera body being provided with a focus detector in a camera body to which a photographing lens is detachably mounted, that detects a focus state for an object image formed by said photographing lens mounted to said camera body;

a lens driver in said camera body that drives a focusing lens group of said photographing lens to a focal position in accordance with said focus state detected by said focus detector; and a controller, in said camera body that drives said focusing lens group at a moving-object prediction mode, taking into account a movement of an image surface of said object, when said object is moving;

said photographing lens being provided with lens data which represents a relationship between an amount of drive of said lens driving means and a displacement of said image surface;

said controller determining one of an execution and a prohibition of an operation at said moving-object prediction mode in accordance with said lens data.

* * * * *